US009460116B2

(12) United States Patent
Pilskalns

(10) Patent No.: US 9,460,116 B2
(45) Date of Patent: Oct. 4, 2016

(54) CONFIGURABLE GROUPS OF VIRTUAL WALLS PROVIDING PROXIMITY RELATED PRIVILEGES

(71) Applicant: GeoMonkey, Inc., Vancouver, WA (US)

(72) Inventor: Orest Pilskalns, Missoula, MT (US)

(73) Assignee: GeoMonkey, Inc., Vancouver, WA (US)

( * ) Notice: Subject to any disclaimer, the term of this patent is extended or adjusted under 35 U.S.C. 154(b) by 0 days.

(21) Appl. No.: 13/628,335

(22) Filed: Sep. 27, 2012

(65) Prior Publication Data

US 2013/0023291 A1 Jan. 24, 2013

Related U.S. Application Data

(63) Continuation-in-part of application No. 12/762,122, filed on Apr. 16, 2010.

(60) Provisional application No. 61/170,554, filed on Apr. 17, 2009.

(51) Int. Cl.
*G06F 17/30* (2006.01)
*G06Q 30/02* (2012.01)
*G01S 5/02* (2010.01)

(52) U.S. Cl.
CPC ..... *G06F 17/30241* (2013.01); *G06F 17/3087* (2013.01); *G06Q 30/02* (2013.01); *G01S 5/02* (2013.01)

(58) Field of Classification Search
CPC .............. G06F 17/30699; G06F 17/30867; G06F 17/30029; G06Q 30/0261; G06Q 20/32
USPC ....................................... 707/754
See application file for complete search history.

(56) References Cited

U.S. PATENT DOCUMENTS

| | | | |
|---|---|---|---|
| 6,185,587 B1 * | 2/2001 | Bernardo et al. | 715/234 |
| 6,684,369 B1 * | 1/2004 | Bernardo et al. | 715/205 |
| 6,959,387 B2 | 10/2005 | Walker et al. | |
| 7,196,639 B2 | 3/2007 | Joyce et al. | |
| 7,349,481 B2 | 3/2008 | Steentra et al. | |
| 7,475,060 B2 | 1/2009 | Toyama et al. | |
| 7,599,795 B1 | 10/2009 | Blumberg et al. | |
| 7,873,372 B2 | 1/2011 | Creemer | |
| 8,073,461 B2 | 12/2011 | Altman et al. | |
| 8,099,109 B2 | 1/2012 | Altman et al. | |
| 8,260,320 B2 * | 9/2012 | Herz | 455/456.3 |
| 2004/0205572 A1 * | 10/2004 | Fields et al. | 715/513 |

(Continued)

OTHER PUBLICATIONS

Office action for U.S. Appl. No. 12/762,122, mailed on May 14, 2012, Pilskalns, "Use of Mobile Devices for Viewing and Publishing Location-Based User Information", 14 pages.
Non-Final Office Action for U.S. Appl. No. 12/762,122, mailed on Sep. 11, 2012, Pilskalns, "Use of Mobile Devices for Viewing and Publishing Location-Based User Information", 10 pages.

(Continued)

*Primary Examiner* — Rehana Perveen
*Assistant Examiner* — Alexander Khong
(74) *Attorney, Agent, or Firm* — Lee & Hayes, PLLC

(57) ABSTRACT

A group of common users each with a mobile device are provided access to information displayed on a group of virtual walls. Each wall corresponds to a different real world location or venue owned or associated with a common entity. The mobile devices are used for viewing information and, when in the vicinity of the real world locations, publishing location-based user content to the corresponding walls. Groups of virtual walls may be created from a set of configurable templates, each template representing a different business vertical.

17 Claims, 6 Drawing Sheets

(56) References Cited

U.S. PATENT DOCUMENTS

| | | |
|---|---|---|
| 2004/0230371 A1 | 11/2004 | Vincent et al. |
| 2005/0075097 A1 | 4/2005 | Lehikoinen et al. |
| 2006/0178932 A1 | 8/2006 | Lang |
| 2006/0236258 A1 | 10/2006 | Othmer et al. |
| 2006/0242013 A1* | 10/2006 | Agarwal et al. ............. 705/14 |
| 2007/0032225 A1* | 2/2007 | Konicek et al. ............ 455/417 |
| 2007/0073562 A1 | 3/2007 | Brice et al. |
| 2008/0109761 A1 | 5/2008 | Stambaugh |
| 2008/0132251 A1 | 6/2008 | Altman et al. |
| 2008/0132252 A1 | 6/2008 | Altman et al. |
| 2008/0133336 A1* | 6/2008 | Altman et al. ............. 705/10 |
| 2008/0172632 A1 | 7/2008 | Stambaugh |
| 2008/0214157 A1 | 9/2008 | Ramer et al. |
| 2008/0248815 A1* | 10/2008 | Busch ................... 455/456.5 |
| 2009/0055725 A1 | 2/2009 | Portnov et al. |
| 2009/0319181 A1* | 12/2009 | Khosravy et al. .......... 701/208 |
| 2010/0075697 A1 | 3/2010 | Gupta et al. |
| 2010/0130233 A1* | 5/2010 | Parker ................... 455/456.3 |
| 2010/0268717 A1 | 10/2010 | Pilskalns |

OTHER PUBLICATIONS

U.S. Appl. No. 13/172,706, filed Jun. 29, 2011 (not yet published).

Office Action for U.S. Appl. No. 12/762,122, mailed on Oct. 28, 2013, Orest Pilskalns, "Use of Mobile Devices for Viewing and Publishing Location-Based User Information," 18 pages.

Office action for US Patent Application 12/762,122, mailed on 11/1008/12, Pilskalns et al., "Use of Mobile Devices for Viewing and Publishing Location-Based User Information", 19 pages.

Final Office Action for U.S. Appl. No. 12/762,122, mailed on Mar. 29, 2013, Pilskalns, "Use of Mobile Devices for Viewing and Publishing Location-Based User Information", 16 pages.

Non-Final Office Action for U.S. Appl. No. 12/762,122, mailed on May 21, 2013, Pilskalns, "Use of Mobile Devices for Viewing and Publishing Location-Based User Information", 19 pages.

Office Action for U.S. Appl. No. 12/762,122, mailed on May 7, 2014, Orest Pilskalns, "Use of Mobile Devices for Viewing and Publishing Location-Based User Information", 17 pages.

Final Office Action for U.S. Appl. No. 12/762,122, mailed on Dec. 29, 2014, Orest Pilskalns, "Use of Mobile Devices for Viewing and Publishing Location-Based User Information", 19 pages.

* cited by examiner

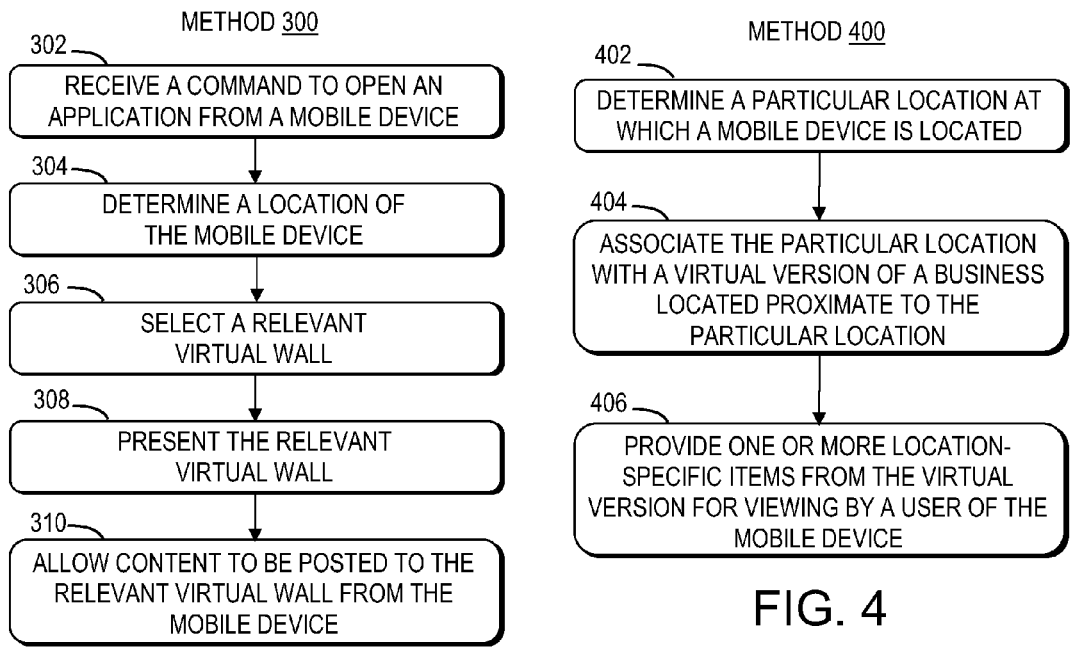
FIG. 3
FIG. 4
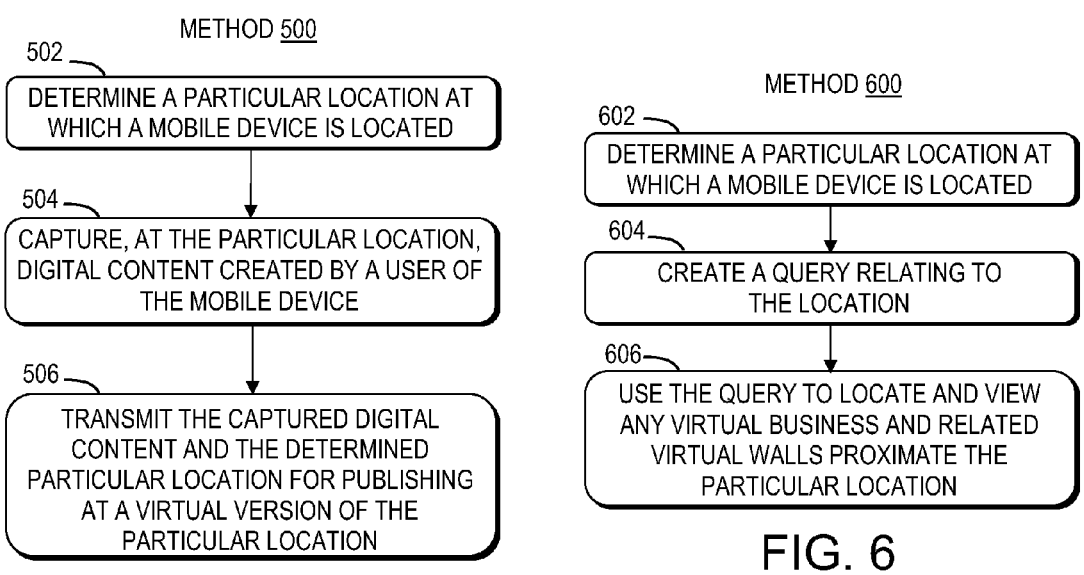
FIG. 5
FIG. 6

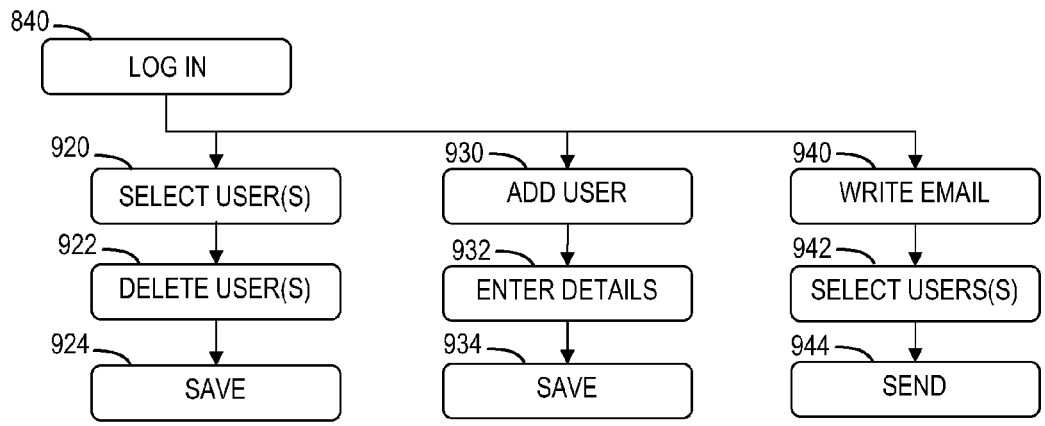
FIG. 14
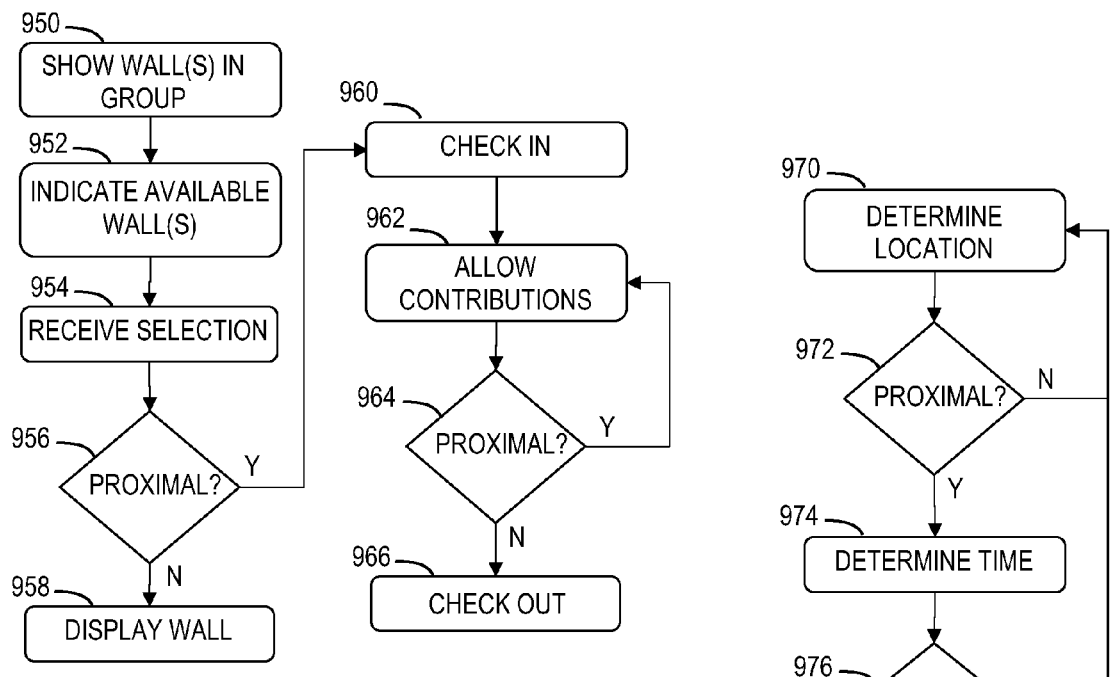
FIG. 15
FIG. 16

CONFIGURABLE GROUPS OF VIRTUAL WALLS PROVIDING PROXIMITY RELATED PRIVILEGES

CROSS-REFERENCE TO RELATED APPLICATIONS

This application is a continuation in part of, and claims priority from, U.S. patent application Ser. No. 12/762,122, filed on Apr. 16, 2010, which in turn claims priority from U.S. Provisional Application No. 61/170,554, filed on Apr. 17, 2009, both of which are incorporated herein by reference in their entirety.

BACKGROUND

Numerous tools exist for electronically presenting geographic information to users. Very few tools exist for obtaining real-time geographic information from users. Many users have mobile devices from which they receive and transmit information to and from multiple digital locations. There are not many useful implementations linking this mobile user-transmitted data with actual geographical locations in a manner that would be useful to the user.

SUMMARY

The present invention relates to the use of mobile devices for viewing and publishing location-based user information. In particular, the present invention relates to configurable groups of virtual walls, where the walls in a given group correspond to real physical locations of a single business or entity. Each group of walls has its own set of users, to whom proximity related privileges are provided for uploading their own content to the walls.

As disclosed herein, an aspect of the present invention is a method for creating a group of virtual walls comprising the computer implemented steps of: displaying on a screen connected to a computer one or more types of group; receiving, by the computer, a selection of a type of group that is to be used as a template to create the group of virtual walls; receiving, by the computer, an identification of one or more users that are to be given access to the group of virtual walls; receiving, by the computer, a definition of a plurality of virtual walls; and for each virtual wall, receiving, by the computer, an association with a different physical location; wherein: each user may view each virtual wall on a mobile device, in communication with the computer, from any location; and each user may upload content from the mobile device to one of the virtual walls when in proximity to the corresponding associated physical location.

As further disclosed, another aspect of the present invention is a system for providing a group of virtual walls with proximity related privileges comprising: one or more servers having one or more computer readable media storing, for each virtual wall, an association with a different physical location, wherein all physical locations are associated with a single entity; a network; and a plurality of mobile devices connected to the server via the network; the system configured to: determine a location of one of said mobile devices; determine whether the location is in proximity to one of said physical locations; and if the location is in proximity to said one physical location, provide a privilege to a user of said one mobile device via said one mobile device.

As still further disclosed, another aspect of the present invention is one or more computer readable media, comprising: a portion of the media storing a group of virtual walls; another portion of the media storing identification of one or more users that have access to the group of virtual walls; for each virtual wall, still another portion of the media storing an association with a different physical location, wherein all physical locations are associated with a single entity; and yet another portion of the media storing, for each of the virtual walls, one or more privileges, which are accessible on a mobile device that is in communication with a computer in which the computer readable media resides when the mobile device is in proximity to the corresponding associated physical location.

BRIEF DESCRIPTION OF THE DRAWINGS

The accompanying drawings illustrate implementations of the subject matter conveyed in the present application. Features of the illustrated implementations can be more readily understood by reference to the following description taken in conjunction with the accompanying drawings. Like reference numbers in the various drawings are used wherever feasible to indicate like elements.

FIGS. 3-7 are flowcharts for accomplishing viewing and publishing of location-based user information relative to a mobile device in accordance with some implementations of the present invention.

FIG. 14 is a flowchart for managing, and communicating to users of, a group of virtual walls in accordance with some implementations of the present invention.

FIG. 15 is a flowchart for listing walls in a group and indicating which a user may check-in to in accordance with some implementations of the present invention.

FIG. 16 is a flowchart for sending a notification of an event in accordance with some implementations of the present invention.

DETAILED DESCRIPTION

Overview

The present invention relates to the use of mobile devices for viewing and publishing location-based user information. In one example, a user may physically enter a place of interest. The place of interest may be associated with an entity, such as a business or organization. In one example, the place of interest (hereinafter, "physical location", "physical business" or "geographical location") can be a restaurant or sporting area, among others. For purposes of explanation, the following discussion utilizes examples where the physical location is a business, but such need not be the case.

When the user enters the physical location, the user may at the same time, choose to (or by default) enter a virtual version of the business (hereinafter, "virtual business") on the user's mobile device. The user may then enter content, such as a text-based comment or capture a digital picture, audio, video, review, or message on the mobile device and, in response, automatically transmit that content to a digital "wall" on the virtual business.

In some implementations, the user may only be allowed to access the physical location's virtual business when the user (and his/her mobile device) is proximate to, or within the physical location. Thus, the user may be on the business's property or in close proximity. For instance, in a food court scenario, the user may be allowed to post content to a virtual version of one of the restaurants of the food court even though the user may be seated in a common seating area.

In one example, the virtual version of the physical location may not even exist, until the user captures or generates data or information for that physical location, wherein after that, information is transmitted, and a "virtual wall" for the business is created. In some configurations, after creation of a new business virtual wall, all future users can see postings for that virtual wall and post to that virtual wall subject to some constraint. For instance, examples of constraints can be whether the user is within a certain range of the physical location of the business and/or whether the user has registered for the service.

In other scenarios, a place of interest, such as a business may have an existing virtual business, such as a web-site or virtual "wall". Some implementations can adjust privileges to the user relative to the virtual business based upon the constraints. For instance, the user may be able to access the business's web-site from any physical location. However, access to on-site coupons or specials can be constrained based upon the user's physical location (i.e., the user can only see the on-site coupons or specials when the user (and the mobile device) are proximate the business's physical location.

Figure 1:
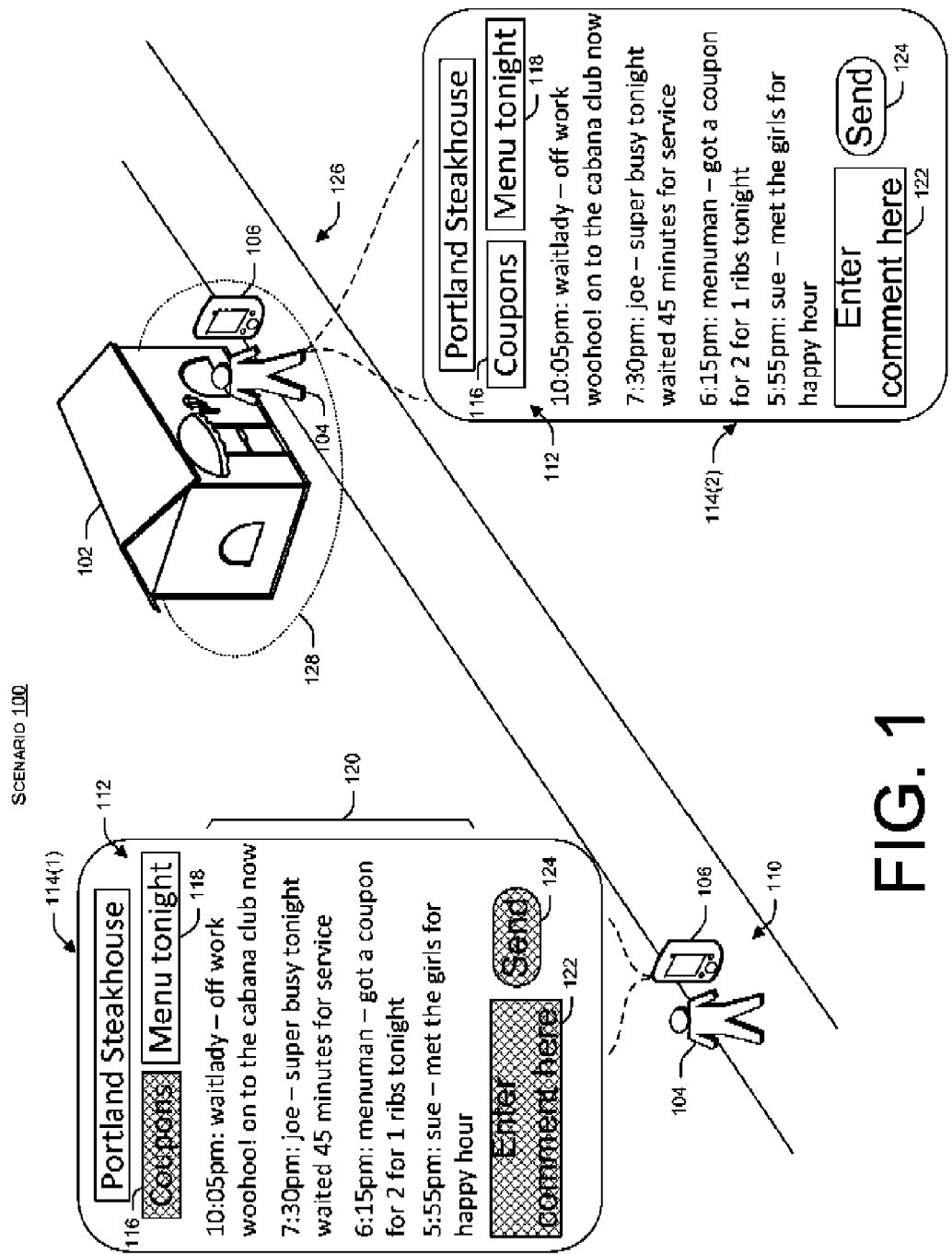
FIG. 1 shows a scenario in which viewing and publishing of location-based user information relative to a mobile device can be employed in accordance with some implementations of the present invention.

For introductory purposes consider FIG. 1 that describes viewing and publishing location-based user information in scenario 100. Scenario 100 involves a hypothetical business named 'Portland Steakhouse' that has a physical location indicated at 102. This scenario also involves a user 104 that has a mobile device 106.

At point 110, the user 104 is on his/her way to the physical location 102 but is not proximate the physical location. In this example, at point 110 the user can access virtual content associated with the Portland Steakhouse. For example, a virtual wall 112 of the Portland Steakhouse is displayed on mobile device 106 and shown on an enlarged display at 114(1). At this point, the user can see content on the virtual wall. The virtual wall 112 includes a 'coupons' dialog box 116, a 'menu tonight' dialog box 118, a comments section 120, an 'enter comment' dialog box 122, and a 'send' dialog box 124. However, some of the options presented on the virtual wall are unavailable to the user 104 at this point based upon one or more constraints. For instance, the user can see the 'comments' section 120 and access the 'menu tonight' dialog box 118. However, as indicated by cross-hatching, the user cannot access the 'coupons' dialog box 116, or enter a comment in the 'enter comment' dialog box 122. This inaccessibility can be based upon a constraint associated with the user's location relative to the business's physical location 102 (i.e., since the user is not proximate the physical location 102 the user's privileges relative to the content are constrained).

Subsequently, at point 126, the user reaches the physical location 102. In this implementation, at point 126 the user 104 can access the virtual business associated with the Portland Steakhouse with enhanced privileges relative to the virtual business. Stated another way, at point 126 the user 104 enters, or is proximate to, the physical location 102 as indicated by dotted line 128. At point 126, the user may be automatically given privileges (or constraints lifted) associated with the virtual business based upon the user's location being proximate to the physical location. In this example, the user can access additional content and/or features in the virtual business based upon the proximity. Specifically, in enlarged display 114(2) the 'coupons' dialog box 116, 'enter comment' dialog box 122, and 'send' dialog box 124 are now available to the user.

The above discussed implementations can provide several potential advantages. For instance, these configurations can produce more reliable content on the virtual business. For example, limiting comment posting to users that are actually at the business can reduce the chances that pranksters or competing businesses might post inaccurate comments.

Some implementations can offer still other virtual features relative to the user's location. For instance, assume that a coffee shop has an offer where upon purchasing nine coffees, the tenth is free. This offer can be manifest as a virtual punch card that is much more convenient than a traditional paper punch card. Each time the user visits the coffee shop, the coffee shop's virtual wall can be automatically presented on the user's mobile device based upon location information. The virtual wall can include the virtual punch card. The user could click on the virtual punch card or the virtual punch card could be automatically presented to the user on the virtual wall. For instance, the virtual punch card can be presented on the virtual wall as a dialog box that says "Dear user—since you are at the coffee shop please have your virtual account punched (i.e. credited).

The process could be rather simple, such as an employee who rings-up the user enters a unique identification for the user and a number of coffees purchased. The information can be uploaded to a service that manages the virtual wall to credit the user's account. A more automated configuration may automatically determine the user's identity such as through the user's credit card and correlate the identity with the number of coffees charged to the user (such as based upon SKUs). This information could then be utilized to credit the user's virtual punch card.

The above described virtual punch cards avoid the user having to carry around a bunch of cards and to sort through them, etc. Further, these implementations can 'follow the user' in situations where the business has multiple locations, further avoiding the typical scenario where the user leaves their paper punch card at their favorite location and then doesn't have it when they go to a different location.

In summary, there is great value to users of a business or other gathering place (school, sports arena, park or outdoor locale) to view and post information specific to that locale, in real-time, from a mobile device. In some implementations this feature may be provided automatically to the user. For instance, in the Portland Steakhouse example, when the user reaches the physical location 102, the virtual businesses web-site or virtual wall may be automatically launched on the user's mobile device based upon location information obtained from the mobile device. In another example, when a user enters a stadium for a sporting event, a virtual wall of the league hosting the event, home team, and/or visiting team may automatically be displayed on the user's mobile device without any effort by the user. Access to and/or privileges associated with the virtual wall may be constrained based upon the user's physical location.

System Example

Figure 2:
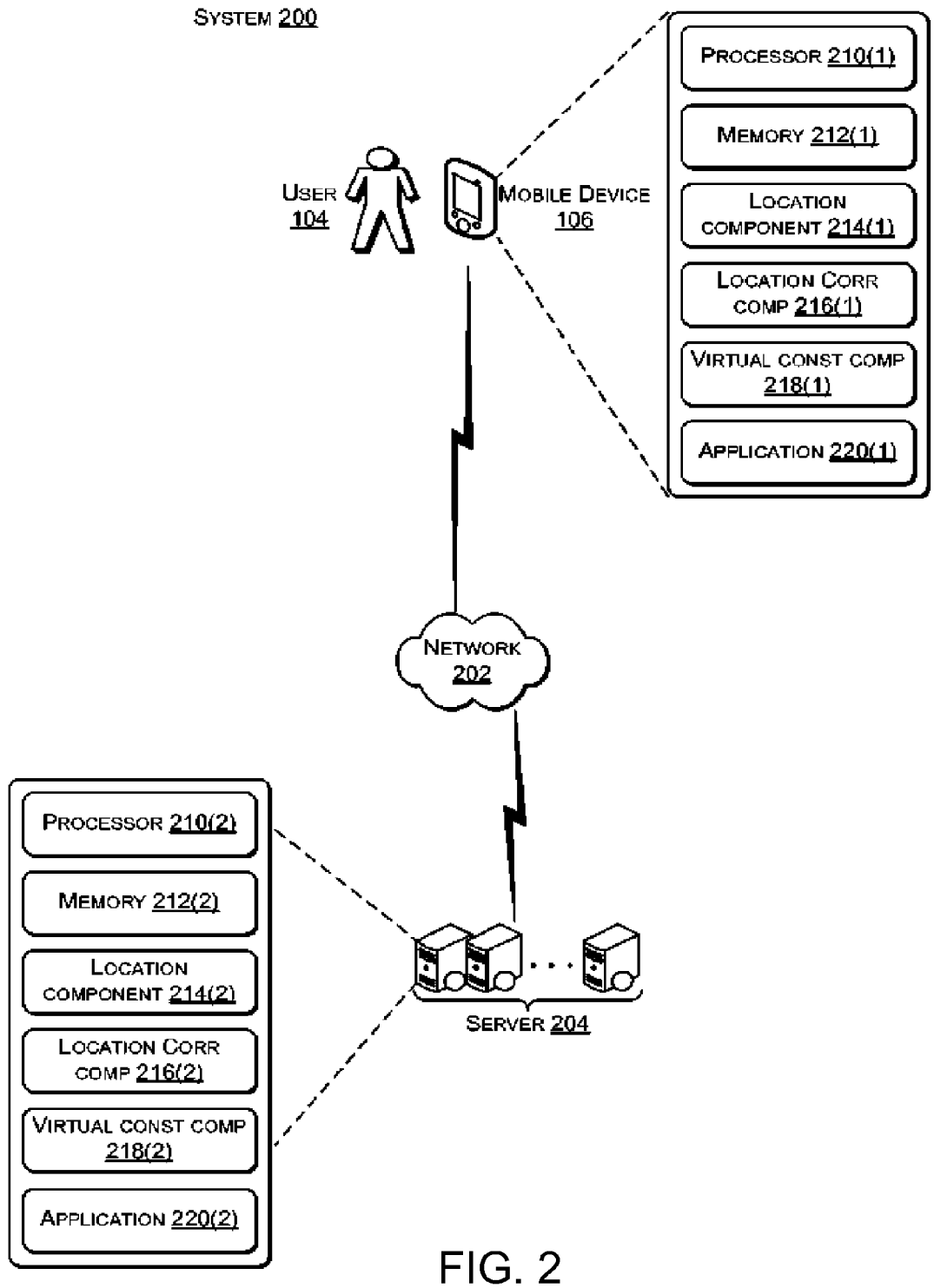
FIG. 2 shows a system that can accomplish viewing and publishing of location-based user information relative to a mobile device in accordance with some implementations of the present invention.

FIG. 2 depicts an illustrative architecture or system 200 configured to support viewing and publishing of location-based user information. System 200 includes mobile device 106 that can be associated with user 104. System 200 also includes network 202 and a server 204. Mobile device 106 can be any sort of device that has some processing capability and a capability to communicate over a network such as network 202. For instance, mobile device 106 may be a mobile phone, a personal digital assistant (PDA), a laptop computer, a portable media player (PMP) (e.g., a portable video player (PVP), a digital audio player (DAP), etc.), or any other type of existing, evolving, or yet to be developed computing device.

Meanwhile, network 202, which is configured to couple mobile device 106 and server 204, may comprise the Internet, a Local Area Network (LAN), a Wide Area Network (WAN), a wireless network, and/or the like. Here, network 202 may comprise a wireless cellular network or a wireless fidelity (Wi-Fi) network. Also, while only a single network is illustrated, the system may entail multiple networks.

As illustrated, either or both of mobile device 106 and server 204 can include one or more processors 210, memory 212, location component 214, location correlation component 216, virtual constraint component 218 and/or application(s) 220. Processor 210 can execute computer readable instructions, such as may be stored on memory 212, to cause a method to be performed.

Location component 214 can be configured to periodically and/or from time-to-time identify the location of mobile device 106. For instance, location component 214 can employ GPS technologies and/or Wi-Fi triangulation technologies, among others to identify the location of mobile device 106. In some cases, the location of the mobile device can be identified on the mobile device by location component 214(1). In other configurations, the mobile device's location can be identified remotely by location component 214(2).

The mobile device's identified location can be communicated to location correlation component 216. The location correlation component can compare the mobile device's location to a location of a place of interest. The location of the place of interest can be determined in the same way as the location of the mobile device and/or be referenced in a look-up table. Stated another way, location correlation component 216 can determine whether the mobile device is proximate to a physical location. For instance, the user 104 may be using application 220 to surf a web-site associated with the physical location.

The location correlation component 216 can determine whether the mobile device 106 is proximate the physical location and communicate that information to the virtual constraints component 218. The virtual constraints component can authorize access to the web-site and/or subject the access to constraints, such as the proximity of location, received from the location correlation component 216. An example of such constrained access is described above relative to FIG. 1.

In some instances, the virtual constraints component 218 may be thought of as a component that manages virtual business and users. For instance, the virtual constraints component may include a mapping of businesses or other places of interest, their physical location, and their virtual content. The virtual constraints component may also maintain a mapping of users that are interested in receiving location specific virtual content. The virtual constraints component can then match users to virtual content based upon the users' physical location information obtained from location component 214.

Stated another way, system 200 enables strategies for annotating a digital space inside a virtual business or gathering place, among others. In some configurations, the system can aggregate geo-located information in real time from users' mobile devices, such as mobile device 106. The aggregated geo-located information can be stored on computer-readable media, such as memory 212, with computer-executable instructions related to that computer-readable media. The computer-readable media can occur on mobile devices and/or on remote computing devices, such as server 204. In some implementations, the geo-located information can be automatically retrieved when an individual mobile device user enters a geographic area that corresponds to the geo-located information.

According to one exemplary aspect, the strategy can involve uploading to a computing device, such as server 204 an object(s) in response to a first instruction. For example, user 104 can issue the first instruction from mobile device 106 when he/she desires to upload an object or other content. In another instance, the first instruction may be issued automatically when the user enters an area associated with the physical business. Server 204 can store the object based upon the location of the mobile device 106 that captured the object. The object may correspond to a text message, digital photograph, media file, photo, video, audio, and so on.

In some implementations, the user location is determined using a location service provided by location component 214(1) on the mobile device 106, such as global positioning system (GPS) or Wi-Fi triangulation. In some cases, the user location may be determined based on user input of address or latitude/longitude coordinates. The strategy further involves, in response to a second instruction, linking the uploaded object to a selected location (or default location) within the virtual business, to thereby provide an annotated "wall". The second instruction can be issued automatically or can be user generated. For instance, if the user's location is proximate to several businesses (i.e., physical locations), the user may specify which corresponding virtual business the object should be associated with. In this strategy, the linking can take place by associating the object with the geographical location and sending the combined information to the server 204.

If the virtual business associated with a physical location does not already exist in the server 204, it can be automatically created on the server. Any other user that enters the virtual business can see postings to the digital "wall" (potentially subject to the constraints) by automatically communicating with the server. In some implementations, a query from mobile devices can use location and returned postings that can be constrained to only that location.

In another example, user 104 may enter a physical location of a business and at the same time, enter a virtual version of the business on the user's mobile device 106. The virtual entrance may trigger an action on behalf of the business wherein the user may then receive information related to the business on the user's mobile device. In this case, the information transmitted to the user's mobile device may be coupons or messaging related to specials or relating to other users who have recently entered the business. In another aspect, the user may initiate the receipt of coupons, messaging or other information from the business to the user's mobile device.

According to another exemplary aspect, the strategy can involve giving the user the option of viewing their digital postings at a later date, either from mobile device 106 or from a computer online interface. The user could in fact view their own historical postings via a private or password-protected web interface that displays their postings on an annotated map, based on the geographical location at which they were captured.

In another example, the owner of the business may receive access to the digital information posted by mobile users on the virtual business, and may be granted access to edit and modify the presence of the virtual business within the system. One example of this may include modifying the look and feel of the virtual business' interface to resemble the physical representation of the business. The owner may also choose to define, such as using an online interface, a geographical boundary around the business. In some implementations, the geographical boundary can be stored as the business location utilized by the location correlation component 216(2). Subsequently, digital postings (or a filtered sub-set thereof) within that geographical boundary (i.e., in a defined area) can be posted to the virtual wall of that business. Virtual boundaries may be created automatically when a user first posts a message. A k-means clustering algorithm is one approach that may be applied in order to auto-define boundaries, if a previous bounds is not defined.

In another scenario, assume for purposes of explanation that two or more users are posting information to a virtual "wall" at approximately the same time. The users' mobile devices can indicate that the users or "posters" are currently in the same area. In some cases, the system can allow the users to communicate via a "chat" interface. In some instances, the chat interface may be limited to the posters (i.e., private). In this example, the digital interactions may provide opportunity for person-to-person digital interaction, as well as in-person interactions.

In another example, users viewing the content on a virtual wall may be able to rate that content using a nominal scale. The ratings may be used to help determine the ordering of the virtual wall postings. Other considerations for ordering the wall postings could include time of posting, length of posting, and ratings on previously rated postings. Postings can be anonymous or associated with a user account.

In another example, the posted information may be viewed from a web interface in the form of a "hot spots" map, wherein clusters of postings may appear as "hot spots" on the geographical location.

Another scenario involving location-based user information can involve linking the virtual business to physical transactions. For example, once a person enters a virtual business, he/she can also access links to pay for parking, for example, or reserve a table, a tee time, or purchase items or merchandise. A further scenario can involve linking the virtual business to other information so a user could access local travel info, history, etc. Still another scenario can involve linking the virtual business to other businesses nearby (i.e. users at a concert venue could find the nearest restaurant or coffee shop). Another scenario can involve sub-domains within a virtual business, such as various holes on a golf course, independent buildings within a complex (i.e. library on a college campus), sections of an airport, etc.

Method Examples

FIG. 3 illustrates a flowchart of a process, technique, or method 300 that is consistent with at least some implementations of the present location-based user information system.

At block 302, the method receives a command to open an application from a mobile device. In some cases, the application may be a web browser application or a social networking application. The application may be resident on the mobile device or may be resident on a server that is communicatively linked with the mobile device.

At block 304, the method determines a location of the mobile device. Various techniques can be employed to determine the location. Non-limiting examples are described above relative to FIG. 2.

At block 306, the method selects a relevant virtual wall. The relevant virtual wall can be selected by correlating a location of the mobile device with a virtual wall of a place of interest that is proximate to the location of the mobile device.

At block 308, the method presents the relevant virtual wall. For instance, the relevant virtual wall can be presented on the mobile device. When the mobile device is proximate a physical business corresponding to the virtual wall, the virtual wall may be presented with less constraints than when the mobile device is not proximate the location of the physical business.

At block 310, the method allows content to be posted to the relevant virtual wall from the mobile device. The privilege of posting content to the virtual wall may be removed when the user leaves the location of the physical business.

FIG. 4 illustrates a flowchart of a process, technique, or method 400 that is consistent with at least some implementations of the present location-based user information system.

At block 402, the method determines a particular location at which a mobile device is located.

At block 404, the method associates the particular location with a virtual version of a business located proximate to the particular location.

At block 406, the method provides one or more location-specific items from the virtual version for viewing by a user of the mobile device. For instance, 'on-site' coupons or specials may be presented for viewing.

FIG. 5 illustrates a flowchart of a process, technique, or method 500 that is consistent with at least some implementations of the present location-based user information system.

At block 502, the method determines a particular location at which a mobile device is located.

At block 504, the method captures, at the particular location, digital content created by a user of the mobile device. In some implementations, the capture may only be allowed when the particular location corresponds to a physical location of the place of interest.

At block 506, the method transmits the captured digital content and the determined particular location for publishing at a virtual version of the particular location.

FIG. 6 illustrates a flowchart of a process, technique, or method 600 that is consistent with at least some implementations of the present location-based user information system.

At block 602, the method determines a particular location at which a mobile device is located.

At block 604, the method creates a query relating to the location.

At block 606, the method uses the query to locate and view any virtual businesses and related virtual walls proximate the particular location.

Figure 7:
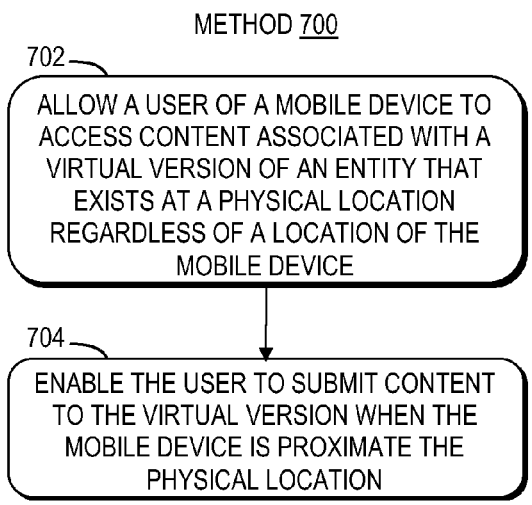

FIG. 7 illustrates a flowchart of a process, technique, or method 700 that is consistent with at least some implementations of the present location-based user information system.

At block 702, the method allows a user of a mobile device to access content associated with a virtual version of an entity that exists at a physical location regardless of a location of the mobile device.

At block 704, the method enables the user to submit content to the virtual version when the mobile device is proximate the physical location.

Groups of Virtual Walls

As described above, a virtual wall is a web based object that is associated with a real world, physical location. By creating virtual walls in groups in conjunction with a controlled set of common users, businesses or other entities with multiple physical locations are able to use the system with greater convenience. Groups of virtual walls may be used for B2B applications; for employees to share their information with managers, clients and other employees; for wholesalers and retailers to interact; for conferences; workforce management; sales force management; engineering management; project management; real estate; municipal works management; municipal information provision; utilities; travel, such as organized tours; recreation; charities; social groups, including venues frequented by members of a social networking group; sports teams and the venues they visit; the delivery industry; music groups; traveling entertainers; etc. Many other different verticals (i.e. groups of similar businesses and customers trading in a specific area within an industry) and/or industries may make use of the invention. A benefit of having groups of virtual walls is that a set of users may be defined once, for all walls within a group. All virtual walls within a group can be displayed to all the users in the group, irrespective of the locations of the physical entities and locations of the users, allowing users to keep aware of what other users within the group are doing. Users may still only upload content to the virtual walls when in their vicinity, but the administrator, manager, creator or owner of the group of virtual walls may make edits from anywhere.

Since each vertical has unique business requirements as well as core functionality, it is possible to set up the system to provide groups of virtual walls that have common functionality and configurable functionality. The configurability allows administrators of the groups of virtual walls to customize basic solutions in terms of workflow and content. Each administrator has unique data management requirements which can be defined when the virtual walls are set up, and later amended as and when required.

Figure 8:
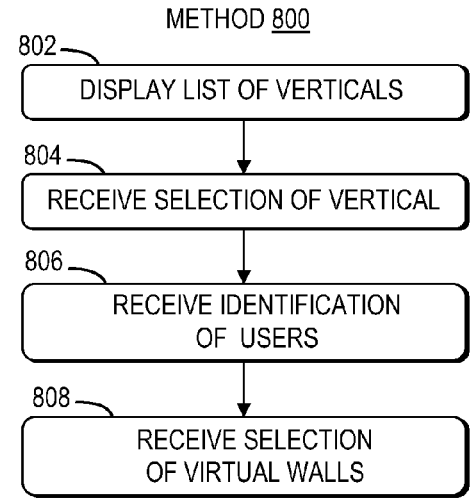
FIG. 8 is a flowchart for creating a group of virtual walls in accordance with some implementations of the present invention.

Referring to FIG. 8, we see a high level flowchart of method 800 for creating a group of virtual walls. In step 802 the server 204 presents a list of verticals to an administrator at a remote terminal, such as a desktop computer connected to network 202. The verticals may each define a distinct category, such as conferences, sales force management, etc. The administrator, responsible for creating the group of virtual walls, selects the vertical for which a group of virtual walls is desired, the server 204 accepting the administrator's selection in step 804. The server 204 then receives, in step 806, identifications of the users that the administrator wants to have in the group. In step 808, the server 204 accepts the administrator's definition of one or more virtual walls, each corresponding to a real physical location.

Figure 9:
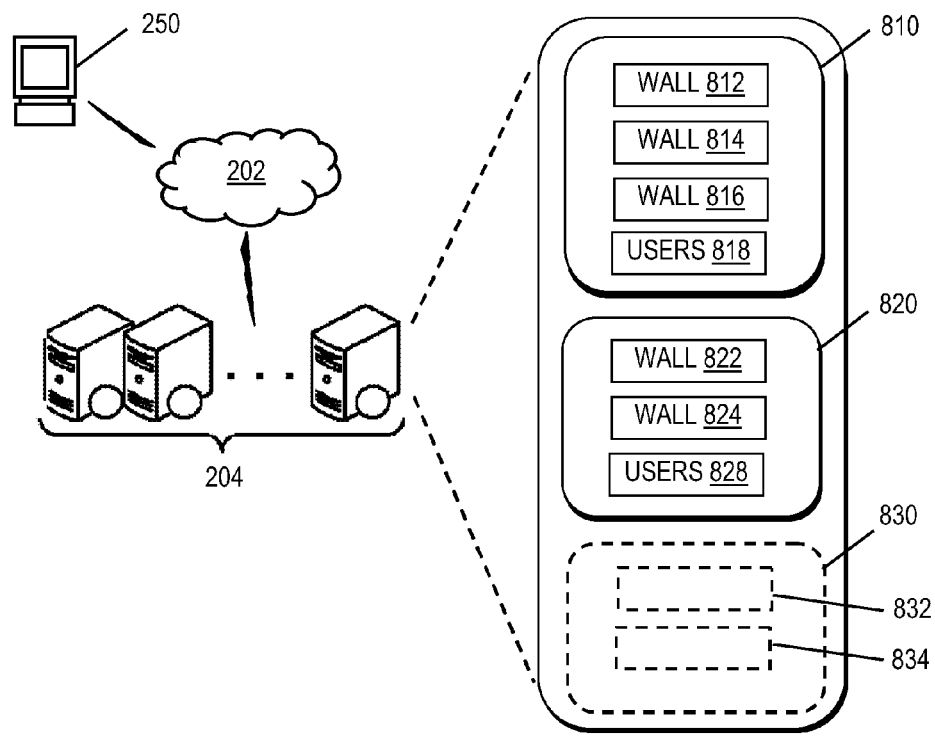
FIG. 9 shows schematically a part of a system for creating and storing groups of virtual walls in accordance with some implementations of the present invention.

FIG. 9 schematically shows the server 204 having computer-readable media in the form of the memory 212, as shown in FIG. 2. The media is comprised of various portions with groups of virtual walls stored therein. For example, a first group 810 of virtual walls includes wall 812, wall 814 and wall 816, each corresponding to a different physical location, is stored in a portion of the media. Group 810 also includes details of the users 818 in the group stored in another portion of the media, and, where specified, permissions to which of the virtual walls they have access to, either for viewing or uploading content to, or both, stored in yet another portion of the media. In a similar way, but possibly for a different vertical, a second group 820 of virtual walls includes wall 822, wall 824 and identifications of users 828 having access to the walls, with associated permissions, if any, are stored a further portion of the media.

Template 830 is one of several group templates that may be stored in the media of the server 204, each template corresponding to a different vertical. Template 830 may include one or more different virtual wall templates 832, 834 that may be generic or tailored to the specific vertical to which the template 830 corresponds. When an administrator selects a vertical, for example via computer 250, the template selected provides the common functionality of the group of virtual walls and also provides configurable options that are specific to the selected vertical. The administrator then adds custom information to the template to make it conform to his particular needs.

Figure 10:
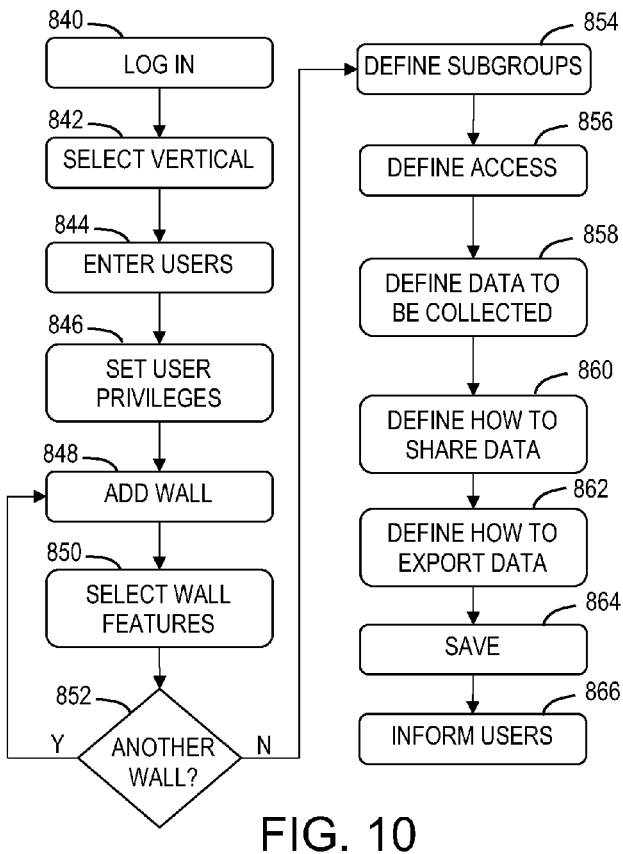
FIG. 10 is a more detailed flowchart for creating a group of virtual walls in accordance with some implementations of the present invention.

FIG. 10 is a more detailed flowchart for creating a group of virtual walls. In step 840, the server 204 accepts the log in of the administrator who is to create the group of walls. In step 842, the server accepts the selection of a vertical and, in step 844, the identification of users. Users may be identified by their email address, for example. In step 846, the server 204 provides the administrator with the option of setting privileges for each user that go beyond the proximity based privileges or the proximity based lifting of constraints. An example of a privilege may the facility for a user to invite another user. Another example of a privilege may be the facility for a user to add another user. Each user may be granted a different privilege. Bear in mind that the more users that can add/invite other users, the more onerous it may become for the administrator to manage the group. The group may in fact be made a public group, in that all users may invite and/or add other users.

In step 848, the server adds a virtual wall to the group according to the administrator's requirements. A virtual wall could represent a work site, a customer's location, etc. The virtual wall may be selected from a group of templates. In step 850, the server receives indication of the features of the wall that are selected by the administrator. This may involve adding, for example, a name, whether information only is to be provided, whether users may check in, whether a loyalty punch card is to be made available, whether e-commerce is available, etc. The server 204 may then, in step 852, prompt the administrator as to whether another virtual wall should be created for a different location. If so, the process reverts to step 848 where another virtual wall is created. If there are no new virtual walls to be added, the process advances to step 854, in which the server 204 optionally allows the administrator to define subgroups of users. Examples of such subgroups may be customers, employees, visitors, salespeople, engineers, technicians, colleagues from other companies, the public and managers. While the default may be that all users are given access to all virtual walls, an administrator may want to limit access to one or more of the walls or specified information or types of information to certain members within the defined group of users, and this is more easily done when subgroups of users are defined. Notifications may also be dependent on user access privileges to virtual walls, information, or types of information. Definition of access rights are made possible by the server 204 in step 856.

The group of virtual walls may be set up by the administrator to provide data about the users and their interactions with the virtual walls. The server 204 allows definition of which data is to be collected in step 858. Collectable data may include check-ins, check-outs, fields, attribute value pairs, etc. Check-ins may have a notification attached that either is for the person checking-in or for people interested about the check-in location. Time and check-in constraints may be used together, for example a person may have missed a deadline for checking-in at a location. For example, a car rally may be added to a virtual wall as an event, and a user may have missed registration for the car rally. In step 860, the administrator may define how the information is to be distributed. For example, a manager may get notification if a salesperson arrives at or misses a meeting event. In step 862, if data is required to be exported to other applications then the administrator may define which application, which data is to be exported and which format it is to be exported in. Throughout, the administrator may be able to define the appearance and workflow of the virtual walls, such as colour scheme, fonts, pictures, logos and how data is to be displayed, whether on a map, in a list or in a notification and the order in which the user interacts with the user interface.

After the administrator has made all the definitions, the group of virtual walls is saved, in step 864, and the server 204 informs users who have been added to the system, via email, for example. However, the administrator may be given the opportunity to test and approve the newly created group of virtual walls before the users are informed. When the users are informed, they are instructed to set, or re-set a password and may be provided with instructions on how to use the application. They may be provided with a link to download a mobile app for their mobile device, or a link to a website that hosts the group of virtual walls.

An administrator may be given the option to modify an existing group of virtual walls, or to create another based on a group that he has already created. In this case, the process will be much the same as in FIG. 10, except that many or all of the data fields are pre-filled and the administrator is given the option to skip back and forth to edit different areas of the group of virtual walls. Depending on the extent of the modifications, they may be allowed as provided by the administrator or a new group of virtual walls may be created. If fields are deleted during the modification, steps may be taken to preserve the corresponding data that existed prior to the deletion.

Figure 11:
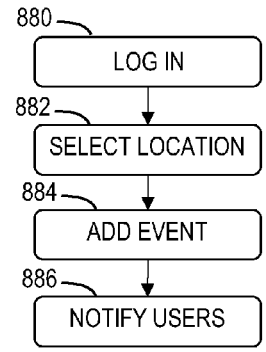
FIG. 11 is a flowchart for adding an event to a virtual wall in accordance with some implementations of the present invention.

FIG. 11 is a flowchart for adding an event to a virtual wall. After logging in, in step 880, an administrator selects, in step 882, the virtual wall or walls corresponding to the physical location or locations of the event. The administrator then proceeds to add the event, in step 884. A drop down menu of template events may be presented to the administrator for his selection. Optionally, as defined by the administrator, users presently checked in at the corresponding virtual wall(s) may then be notified, in step 886, that the event has been created. Alternately, only some of the users may be notified. An administrator may have previously defined, when creating the wall, whether and to whom notifications are sent upon the addition of an event. Notifications may be via email, text messaging or app messaging, etc. Notifications may be triggered by the time of the event, or by a time occurring a certain amount before the start of the event.

Figure 12:
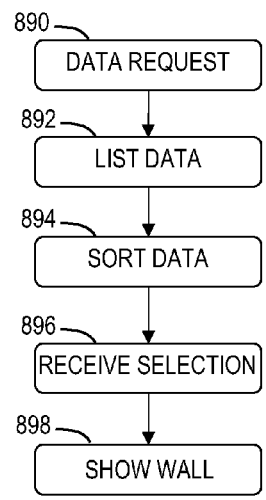
FIG. 12 is a flowchart for viewing data related to the virtual walls in accordance with some implementations of the present invention.

FIG. 12 is a flowchart for viewing data related to the virtual walls. Provided that a user is logged in via a mobile or non-mobile device, a request to view data may be passed to the server 204 in step 890. The user sees a list, in step 892, or map of the data based on setup defined when the group of virtual walls were created. If in a list view the data can be sorted, in step 894, by username, time of creation, time of check-in, location name, virtual wall name, keyword, priority, project name, or any other defined attribute. If in a map view, the virtual walls are listed, in step 892, on the side and indexed via a number, letter or icon in the map, or using an attribute of the data, which may be default or defined. Users can select or click on a list item or on a map based virtual wall icon to get more information, in step 896. In step 898, the corresponding virtual wall may be displayed. All users in a group may be permitted to view the data, or only some of the users may be allowed, depending on how the administrator has created the group of virtual walls.

Figure 13:
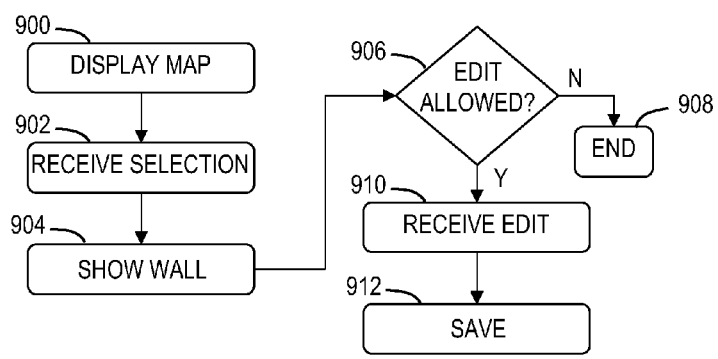
FIG. 13 is a flowchart for editing a virtual wall in accordance with some implementations of the present invention.

If it is allowed by the administrator, users can edit virtual walls, by adding notes or creating a priority list, adding additional relevant information from other sources, or creating a notification for a colleague or manager. FIG. 13 is a flowchart for editing a wall. In step 900, a map is displayed on a user's mobile device 106, with icons for each physical location in the group of locations that has a virtual wall associated with it. The server 204 accepts, in step 902, a selection of a virtual wall by the user tapping or otherwise providing an input to his mobile device 106. The server 204 then causes the mobile device 106 to display the virtual wall in step 904. If the particular user is not allowed to edit the wall, as determined in step 906, then the process ends in step 908. However, if the particular user is allowed to edit the wall, by being allowed by the administrator and being proximate to the physical location associated with the virtual wall, then the server 204 may receive, via mobile device 106, an edit from the user, in step 910. The edit may be a comment, a photo, a vote, a ranking, a message, etc. In step 912, the server 204 saves the provided edit. Instead of a map view, the group of walls may be displayed as a list on the user's mobile device 106.

FIG. 14 is a flowchart for managing, and communicating to users of, a group of virtual walls. The administrator must be logged in, in step 840, in order to be presented various management options by the server 204. In step 920, the administrator may select one or more users and then select them to be deleted from the group in step 922, after which the changes are saved in step 924. In step 930, the administrator chooses to add one or more users. In step 932, the administrator enters the details of the new users and the server saves them in step 934. In step 940, the administrator selects the option to write an email to one or more users belonging to the group or subgroup, selected in step 942. The server then sends the message to the user(s) in step 944.

FIG. 15 is a flowchart for listing walls in a group and indicating which a user may check in to. In step 950, the server 204 causes the virtual walls in the group to be displayed on a user's mobile device 106, either as a list or on a map. The ones available for check-in are indicated, in step 952, according to the proximity of the mobile device 106 to the corresponding physical locations. In step 954, the user selects a virtual wall. If, in step 956, the mobile device 106 is not proximal to the physical location corresponding to the selected virtual wall, the virtual wall is displayed, in step 958, on the mobile device 106. Proximal, as an example only, may be understood to be within about 50 m, about 100 m, 5 m, inside the boundary of the physical location, or some other suitable definition that facilitates the efficient operation of the system of virtual walls. If, in step 956, the mobile device is proximal to the physical location corresponding to the selected virtual wall, the user may check-in to the wall, in step 960. Contributions of content to the wall that is checked into are allowed in step 962. From time to time, the location of the mobile device is determined, and if, in step 964, it is still proximal to the physical location corresponding to the virtual wall that is checked into, then further contributions of content are allowed in step 962. If, in step 964, the user has moved away from the physical location, then the server 204 via the mobile device 106, or the mobile device itself, prompts the user to check-out of the virtual wall in step 966. Alternately, check-out may be automatic when a user has moved away from a physical location that he is checked into, or when a user has not been proximal to the physical location for more than a predetermined amount of time.

FIG. 16 is a flowchart for sending a notification of an event. In step 970, the user's location is determined, by determining the location of the user's mobile device 106. If, in step 972, the user is proximal to a physical location, the system determines the time in step 974. If, in step 976, there is an upcoming event at the physical location, the user is notified 978 by the sending of a message to the user's mobile device 106. Notification may be an email, a text message or an internal application message. Depending on how the virtual walls and events are set up, the notifications may either be given if the user is checked in or irrespectively of whether the user is checked in or not. Notifications may still be given after the event has started.

Users can setup check-in notifications or reminders, etc., for other users checking in if allowed by the access privileges, if the access privileges exist.

Users may be given notifications depending on their activities or other users' activities if allowed by the access privileges, if the access privileges exist.

Maps can be customized in the mobile app to show only events, and the order of events via a numbering scheme. Parallel events may be shown with a number and a letter in map view, and by time in the list view.

Notifications may be given to the users themselves, or to other members of the group or a subgroup which may be interested in the activities of other users. Notifications must conform to the access privileges set by the administrator.

As customers use a wide variety of platforms, the groups of virtual walls may be implemented using a technology that is platform independent, such as HTML 5. Other technologies may alternately be used, in whole or in part. Technologies like HTML 5 can be used in part with platform specific technology. The platform specific technology acts as a shell and contains the HTML 5, which is dynamic. The shell program allows access to hardware specific devices, such as a GPS receiver, camera, and microphone. The HTML 5 code can be updated dynamically and shared across platforms, without the intervention of an application store interface (e.g. Apple™ App Store). The dynamic updating allows administrators to push changes to user applications in real time. The result is that the user interface and work flow can be modified on a per user basis, without the time consuming process of submitting custom applications to a third party vendor, such as an application store. In addition this model allows developers of the software to share code across platforms, since HTML 5 is platform independent.

For groups of virtual walls with large numbers of users, a facility for reporting abuse may be added.

Administrators may create more than one group of virtual walls, and each group may have an associated app for running on mobile devices. As a result, when they log in, they will be presented with a list of apps that they have created and can edit, as well as having the ability to create new groups.

While each physical location within a group has been described largely as having one virtual wall associated with it, it is possible for a virtual wall to have multiple pages, or effectively multiple virtual walls may be associated with a single physical location.

If the administrator has not paid for service they may be given a notification that their group of virtual walls will be disabled in a certain number of days.

The order in which the above listed methods are described is not intended to be construed as a limitation, and any number of the described blocks or acts can be omitted, repeated or combined in any order to implement the methods, or an alternate method. Numbers and other values can be changed to suit various different embodiments that are possible. Furthermore, the methods can be implemented in any suitable hardware, software, firmware, or combination thereof such that one or more computing devices can implement the methods and/or cause the methods to be implemented. Implementation may be shared between one or more servers and one or more mobile electronic devices. In one case, the methods are stored on a computer-readable storage media as a set of instructions such that execution by a computing device causes the methods to be performed.

The invention claimed is:

1. A method for creating a group of virtual walls, comprising the computer implemented steps of:
   displaying on a screen connected to a computer one or more types of groups of virtual walls, wherein individual types of groups represent a vertical;
   receiving, by the computer, a selection of a type of group that is to be used as a template to create the group of virtual walls;
   receiving, by the computer, an identification of one or more users that are to be given access to the group of virtual walls;
   receiving, by the computer, a definition of a plurality of virtual walls; and
   for each virtual wall, receiving, by the computer, an association with a different physical location and a check-in time associated with the physical location;
   wherein:
   each user may upload content from the mobile device to one of the virtual walls when in proximity to the corresponding associated physical location prior to the check-in time associated with the physical location.

2. The method according to claim 1, further comprising:
   receiving, by the computer, for one or more of the virtual walls, a selection of one or more privileges that are to be accessible by users who are in proximity to its associated physical location.

3. The method according to claim 2 wherein a privilege includes:
   an electronic punch card;
   a special menu;
   a notification of an identity of a user who has uploaded content and is proximal to the associated physical location; or a facility to electronically chat to other users proximal to the associated physical location.

4. The method according to claim 1, further comprising receiving, by the computer, inputs for configuring the group of virtual walls.

5. The method according to claim 1, further comprising receiving, by the computer, a definition of a geographic boundary that defines a physical location.

6. The method according to claim 1, further comprising automatically determining, by the computer, a geographic boundary that defines a physical location.

7. The method according to claim 1, further comprising receiving, by the computer, an identification of one or more further users that are to be given access to fewer than all the virtual walls.

8. A system, comprising:
one or more servers having one or more computer readable media storing, for individual virtual walls of a group of virtual walls, an association with a different physical location, wherein all physical locations are associated with an event in which event participants travel between the different physical locations, the one or more servers connected to:
a network; and
a plurality of mobile devices connected to the server via the network;
the system configured to:
determine a location of one of said mobile devices;
determine whether the location is in proximity to one of said physical locations, wherein said one physical location has an associated check-in deadline; and
based on the location of said one mobile device being in proximity to said one physical location and based on a current time being before the check-in deadline, provide privileged access to the virtual wall associated with said physical location to a user of said one mobile device via said one mobile device based at least in part on the location of said one mobile device being in proximity to said one physical location, wherein the privileged access includes a check-in functionality to record that the user arrived at said one physical location.

9. The system of claim 8 wherein the privileged access further includes a facility to upload content to the virtual wall associated with said one physical location.

10. The system of claim 8 wherein the privileged access further includes at least one of:
a permission to access information;
a permission to access a type of information; or
a permission to set up a notification.

11. The system of claim 8 wherein the privileged access further includes at least one of:
a special menu; or
a notification of an identity of a user who has uploaded content and is proximal to the associated physical location.

12. The system of claim 8 further configured to display, on said one mobile device, details of individual virtual walls in the group of virtual walls.

13. One or more non-transitory computer readable memories, comprising:
a portion of the memories storing a group of virtual walls;
another portion of the memories storing identification of one or more users that have access to the group of virtual walls;
for individual virtual walls, still another portion of the memories storing an association with a different physical location, wherein all physical locations are associated with a single event in which event participants travel between the different physical locations and wherein each physical location has an associated check-in time; and
another portion of the memories storing, for individual virtual walls, one or more privileges, which are accessible on a mobile device that is in communication with a computer in which the one or more computer readable memories reside when the mobile device is in proximity to the corresponding associated physical location prior to the check-in time associated with the physical location, wherein the one or more privileges include a check-in functionality to record that the mobile device is in proximity to the corresponding associated physical location.

14. The one or more non-transitory computer readable memories of claim 13 further comprising computer readable instructions that, when executed by one or more processors cause:
determination of a location of one of a plurality of mobile devices;
determination of whether the location is in proximity to one of said physical locations; and
if the location is in proximity to said one physical location, provision of a privilege to a user of said one mobile device via said one mobile device.

15. The one or more non-transitory computer readable memories of claim 13, wherein a privilege includes a facility to upload content to the virtual wall associated with said one physical location.

16. The one or more non-transitory computer readable memories of claim 13, wherein a privilege includes at least one of:
a notification of an identity of a user who has uploaded content and is proximal to the associated physical location; or
a facility to electronically chat to other users proximal to the associated physical location.

17. The one or more non-transitory computer readable memories of claim 13, wherein the instructions, when executed, cause the one or more processors to display, on the mobile device, details of each virtual wall in the group of virtual walls.

* * * * *